Sept. 28, 1965   R. C. BRIDGEMAN   3,209,236
SEMICONDUCTOR VOLTAGE REGULATOR
Filed Dec. 21, 1962
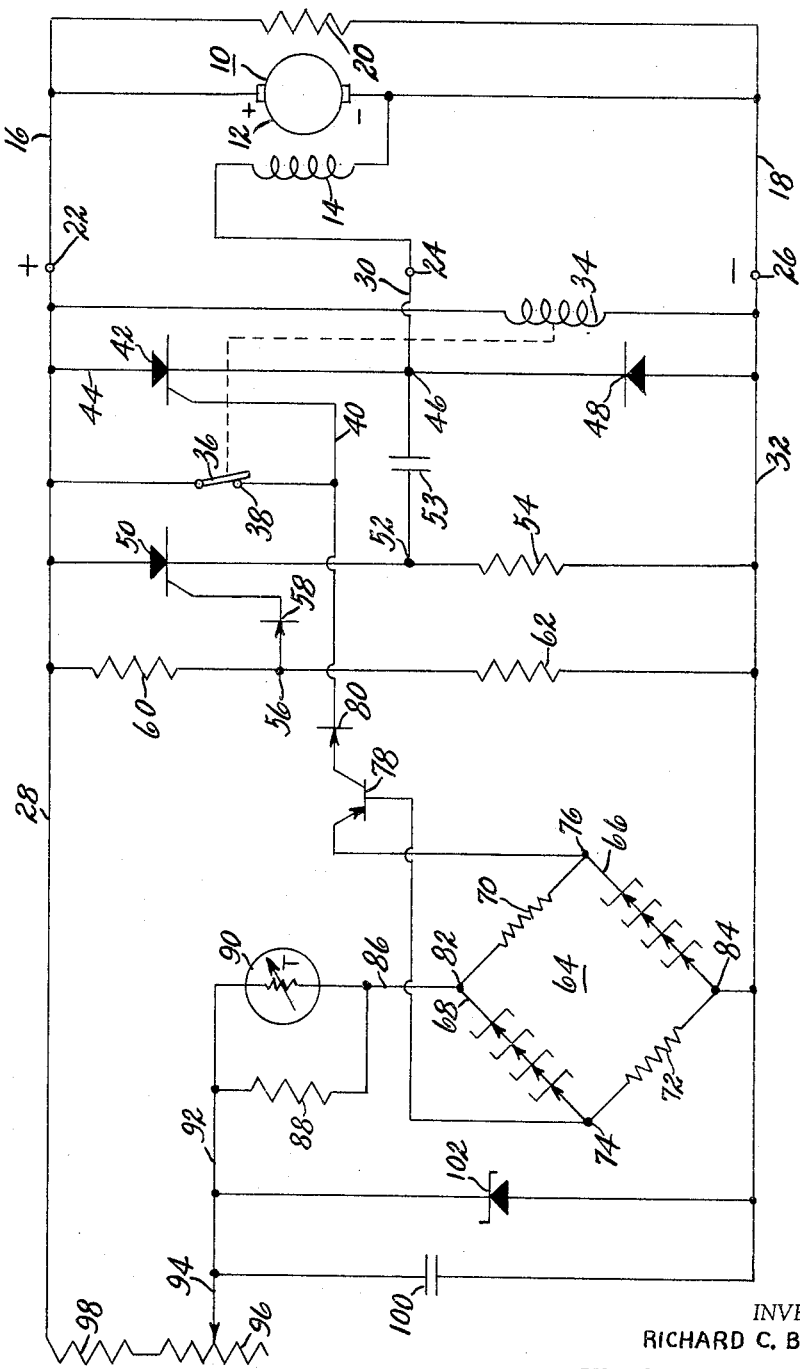
INVENTOR.
RICHARD C. BRIDGEMAN
BY C. R. Meland
HIS ATTORNEY

United States Patent Office 3,209,236
Patented Sept. 28, 1965

3,209,236
SEMICONDUCTOR VOLTAGE REGULATOR
Richard C. Bridgeman, Clarendon Hills, Ill., assignor to General Motors Corporation, Detroit, Mich., a corporation of Delaware
Filed Dec. 21, 1962, Ser. No. 246,467
8 Claims. (Cl. 322—28)

This invention relates to voltage regulators that employ static circuit components such as controlled rectifiers and more particularly to a voltage regulator which is capable of controlling the output voltage of a generator. The subject matter of this invention is an improvement of the voltage regulator disclosed and claimed in co-pending patent application Serial No. 204,760, filed on June 25, 1962, and assigned to the assignee of this invention.

In the above-mentioned co-pending patent application, a semiconductor voltage regulator is disclosed and claimed wherein a controlled rectifier controls the field current of a generator and wherein this controlled rectifier is turned on and off by a detector circuit and by an oscillator which is capable of turning off the controlled rectifier when the voltage conditions as detected by the detector are of a predetermined value.

The present invention is an improvement of that system and is directed to a voltage regulator which has a greater inherent thermal stability and which is also capable of better voltage regulation.

It accordingly is one of the objects of this invention to provide an improved semiconductor voltage regulator which has greater inherent thermal stability. This object is carried forward by employing a silicon transistor and Zener diode bridge in the detector circuit. This combination has greater thermal stability than the detector disclosed in the above co-pending application.

Another object of this invention is to provide a semiconductor voltage regulator which has an improved voltage regulation characteristic.

Still another object of this invention is to provide a semiconductor voltage regulator wherein the detector or voltage sensing circuit is protected from destruction by voltage transients.

Another object of this invention is to provide a semiconductor voltage regulation that has a reduced volume weight and cost as compared to those heretofore known.

Further objects and advantages of the present invention will be apparent from the following description, reference being had to the accompanying drawings wherein preferred embodiments of the present invention are clearly shown.

In the drawings:

The single figure drawing is a schematic circuit diagram illustrating a voltage regulator made in accordance with this invention and a generator that is regulated thereby.

Referring now to the drawing, the reference numeral 10 generally designates a D.C. shunt generator which has an armature 12 and a field winding 14. As is well-known to those skilled in the art, the output voltage of the generator 10 depends upon the amount of field current which is permitted to flow through the field winding 14. In this invention, the field winding 14 is excited by the output voltage of the generator 10 and the armature 12 is connected with conductors 16 and 18. The conductors 16 and 18 feed an electrical load 20 which may be any device that is to be fed from the generator 10.

The output voltage of the generator 10 which appears between conductors 16 and 18 is maintained substantially constant by the semiconductor voltage regulator of this invention. This voltage regulator has a positive input terminal 22, field terminal 24, and a negative terminal 26. It is seen that the positive terminal 22 is connected with positive conductor 16 whereas the field terminal 24 is connected with one side of the field winding 14. The negative conductor 18 is connected with the negative terminal 26 and one side of the field winding 14 is connected with the negative side of the armature 12.

The positive terminal 22 of the voltage regulator is connected with a conductor 28. The field terminal of the voltage regulator 24 is connected with conductor 30. The negative terminal 26 of the voltage regulator is connected with a conductor 32. A relay coil 34 is connected across conductors 28 and 32 and this coil controls a contact 36 which can engage a fixed contact 38. The movable contact 36 is normally in engagement with the fixed contact 38 but when the generator 10 builds up to its regulated output voltage, the relay coil 34 is energized sufficiently to cause the contactor 36 to move out of engagement with the fixed contact 38. The contact 36 can be spring biased into engagement with the contact 38 if so desired. It is seen that the contactor 36 is connected with conductor 28 whereas the fixed contact 38 is connected with conductor 40.

The field current for field winding 14 is controlled by a semiconductor which in this case, takes the form of a silicon controlled rectifier 42. The controlled rectifier has an anode which is connected with conductor 28 via conductor 44. The cathode of controlled rectifier 42 is connected with a junction 46. A diode 48 is connected between junction 46 and the conductor 32. It is seen that the junction 46 is connected with conductor 30 and that the gate electrode of controlled rectifier 42 is connected with conductor 40.

The parts that have just been described can be termed the power output stage or power stage of the voltage regulator since the anode-cathode circuit of the controlled rectifier 42 controls the current flowing through the field winding 14. This circuit can be traced from the positive side of the generator 10, through conductors 16 and 28, through conductor 44, through the anode-cathode circuit of controlled rectifier 42, through junction 46, through conductor 30, through terminal 24 and then through field winding 14 to the negative side of the generator 10. As will be more fully described hereinafter, a circuit can also be traced through the diode 48 for induced voltages in the field winding 14 when the controlled rectifier 42 is turned off in its anode-cathode circuit.

The semiconductor regulator of this invention has an oscillator section which includes a second silicon controlled rectifier 50. The anode of controlled rectifier 50 is connected with the conductor 28 while the cathode of this controlled rectifier is connected with junction 52. A capacitor 53 is connected between junctions 52 and 46. A resistor 54 is connected between junction 52 and conductor 32. The gate electrode of controlled rectifier 50 is connected with a junction 56 through a semiconductor diode 58. It can be seen that a resistor 60 connects the junction 56 with conductor 28 while another resistor 62 connects the junction 56 with conductor 32. The resistors 60 and 62 form a voltage divider which is connected across power conductors 28 and 32. The operation of the oscillator circuit and how it effects the controlled rectifier 42 is more fully described hereinafter.

The semiconductor regulator of this invention has a detector circuit which includes a voltage reference bridge designated in its entirety by reference numeral 64. This bridge might also be termed a two-diode bridge since the arms 66 and 68 of the bridge are formed of series connected Zener diodes. It is seen that these arms of the bridge are each comprised of four Zener diodes and these Zener diodes each have the same breakdown voltage. By way of example and not by way of limitation, where it is desired to maintain 74 volts between conductors 28 and 32, the voltage rating of each Zener diode may be 5.6 volts. This means that each arm 66 and 68 has a breakdown voltage of 22.4 volts. As is well-known to those skilled in the art, the Zener diode is a semiconductor device which breaks down in a reverse direction when its breakdown voltage is exceeded. These Zener diodes are also a constant voltage device once the breakdown voltage is exceeded all of which is well-known to those skilled in the art.

The other two arms of the bridge are comprised of resistors 70 and 72 which have identical resistance. By way of example but not by way of limitation, these resistors 70 and 72 may each be 300 ohms.

The output terminals 74 and 76 of the Zener bridge 64 are connected respectively with the base and emitter electrodes of a PNP silicon transistor 78. The collector electrode of transistor 78 is connected with conductor 40 through the semiconductor diode 80.

The input terminals 82 and 84 of the Zener bridge 64 are connected respectively with conductor 86 and the conductor 32. The conductor 86 is connected with one side of a resistor 88 and is also connected to one side of a negative temperature coefficient of resistance element 90. The circuit element 90 may have a resistance of 10 ohms at 75° centigrade and this resistance will decrease as the temperature of the circuit elements increases. The opposite side of resistors 88 and 90 are connected with conductor 92 which in turn is connected to the shiftable tap 94 of a potentiometer resistor 96. The potentiometer resistor is connected with conductor 28 via resistor 98.

A capacitor 100 is connected between conductor 92 and conductor 32 and a Zener diode 102 is connected in shunt with the capacitor 100. This Zener diode 102 is also connected in shunt with the resistors 88 and 90 and the Zener bridge 64. The Zener diode 102 may have a breakdown voltage of 51 volts where the output voltage of the generator is to be maintained at approximately 74 volts and where the voltage which is applied between conductors 92 and 32 is in the neighborhood of 45 volts.

In order to better understand the operation of the voltage regulator of this invention, the oscillator circuit which includes the controlled rectifier 50 will first be described. In order to start the explanation of the operation of the oscillator circuit, let it first be assumed that the controlled rectifier 50 is turned off in its anode-cathode circuit. In this condition of operation, the cathode will have substantially the same potential as the negative conductor 32. The gate electrode of the controlled rectifier 50 will at this time have a potential which is positive and which is the potential of junction 56. This potential is intermediate the potential of positive and negative conductors 28 and 32. Since a controlled rectifier will conduct in its anode-cathode circuit whenever the gate electrode is positive with respect to the cathode, it can be seen that controlled rectifier 50 will now conduct in its anode-cathode circuit. The current which flows through the anode-cathode circuit of controlled rectifier 50 will flow through the resistor 54 to the negative conductor 32 and will also flow through the capacitor 53 to charge the capacitor. At this instant, there is a considerable surge current charging the capacitor 53. During this time, the cathode will be at very nearly the potential of positive conductor 28 and the diode 58 will block reverse gate current.

The charging current flowing into capacitor 53 decreases as the capacitor accumulates a charge. The inductance of the generator 10, however, causes this current to flow even after the capacitor 53 has been charged to the potential appearing across conductors 28 and 32 and the capacitor is therefore charged to a higher potential than that available across conductors 28 and 32. When this happens, the potential of the cathode of controlled rectifier 50 becomes positive with respect to its anode and causes the controlled rectifier 50 to turn off in its anode-cathode circuit. The capacitor 53 will now discharge through resistor 54. The potential of the cathode of controlled rectifier 50 follows the normal decay of the discharging capacitor 53 to the point wherein the potential of the cathode of controlled rectifier 50 is less than the potential of its gate electrode. At this point, the controlled rectifier turns back on and goes through another cycle of a type described above.

The net result of this is that a voltage is developed at junction 46 which increases to a positive value and then decreases. This voltage has a predetermined frequency and these timing voltage pulses may occur at periods of approximately one millisecond. It can be seen from the foregoing, that the oscillator provides a pulsating voltage at junction 46 which, as will be more fully described hereinafter, can turn off the controlled rectifier 42 under certain conditions of operation.

The oscillator frequency is controlled by the time constant of resistor 54 and capacitor 53. It is pointed out, however, that the potential at junction 56 is above the potential of conductor 32 and the capacitor 53 does not fully discharge before the controlled rectifier 50 again fires. By way of example but not by way of limitation, junction 56 may be at 34 volts and the period of oscillation as noted above can be one millisecond.

The detector circuit of the semiconductor voltage regulator will now be described. It can be seen that a part of the voltage appearing across conductors 28 and 32 will also appear between the input terminals 82 and 84 of the Zener bridge 64. Since junctions 76 and 84 are connected by the Zener diodes, the junction 76 must always be at some predetermined potential above the potential of conductor 32. By similar reasoning, the potential of junction 74 must always be at some predetermined potential below that of junction 82. It will be appreciated that there is a certain potential which when applied between junctions 82 and 84 will cause the bridge 64 to be in a null condition such that there is no difference in potential between junctions 74 and 76. It also will be seen that when the potential of the generator is below the desired regulated value, the terminal 76 will be positive with respect to terminal 74. On the other hand, if the output voltage of the generator 10 is above the desired regulated value, the junction 74 will be positive with respect to junction 76.

It can be seen that the potential difference between junctions 74 and 76 is used to control the conduction of transistor 78. Thus where the output voltage of the generator is too high, the potential of junction 74 becomes positive with respect to junction 76, and the transistor 78 is biased to a nonconductive condition in its emitter-collector circuit. As a result of this, there is no gate current applied to the gate electrode of controlled rectifier 42. On the other hand, when the output voltage of the generator is below its desired regulated value, the bridge output terminal 76 is positive with respect to bridge output terminal 74 and the transistor 78 is turned on in its emitter-collector circuit. This will cause the gate electrode of controlled rectifier 42 to be driven positive with respect to its cathode to bias the controlled rectifier 42 conductive.

In summary, it can be seen that the detector circuit which includes the Zener bridge 64 and the transistor 78 controls the gate current and gate voltage of the controlled rectifier 42. This gate voltage is a function of the output voltage of the generator 10 since a part of this voltage is applied across the input terminals 82 and 84 of the Zener bridge 64.

The potentiometer resistor 96 can adjust the desired regulated output voltage since it can control the amount of voltage applied between conductors 92 and 32.

The Zener diode 102 protects the Zener bridge 64 and the transistor 78 against transient voltages or sustained over voltages. The capacitor 100 filters the commutation ripple and provides a smoother operating regulator.

To summarize the entire operation of the voltage regulator of this invention, it will be appreciated that the amount of current supplied to the field winding 14 depends upon the turning on and turning off of the controlled rectifier 42 in its anode-cathode circuit. The output voltage of the oscillator which includes the controlled rectifier 50 provides an opportunity to turn off the controlled rectifier 42 when the output voltage is such that no positive gate signal is applied through transistor 78. Thus where the output voltage is higher than the desired regulated value, there will be no positive gate voltage applied to controlled rectifier 42 and one of the output pulses of the oscillator can then drive the junction 46 positive to turn off the controlled rectifier 42. Since the output voltage of the oscillator occurs every millisecond, the controlled rectifier has an opportunity to be turned off each millisecond.

It is important to note that the field current flowing through field winding 14 is an average value. When controlled rectifier 42 is turned on, the field current is continuous, flows through controlled rectifier 42 and increases according to the field time constant. When controlled rectifier 42 is turned off, the field current is continuous, flows through diode 48 and decays according to the field time constant. Since the relative on and off periods of the controlled rectifier 42 are magnitudes shorter than the field time constant, the field current assumes an almost continuous average value.

It will be appreciated that the closed contacts 36 and 38 of the relay provide a gate voltage for controlled rectifier 42 to initially turn it on as the generator 10 is building up. When the output voltage of generator 10 reaches a predetermined voltage which is lower than the desired regulated voltage the contactor 36 is shifted to an open position and the gate voltage of controlled rectifier 42 is there determined by transistor 78.

When the output voltage of the generator is low, the controlled rectifier 42 is maintained in a turned on condition since the transistor 78 is conductive and the gate electrode of controlled rectifier 42 has positive voltage applied thereto.

The circuit element 90 which has a negative temperature coefficient of resistance is provided for temperature compensation.

It has been found that the regulator of this invention has good thermal stability which is due to the use of the Zener bridge 64 and to the use of a silicon transistor 78. It has also been found that the regulator of this invention has better voltage regulation characteristics as compared to the regulator illustrated in the above-noted copending application. Where the circuit of the copending application held a regulation of plus or minus one volt, the regulator of this invention is considerably better in that it holds a regulation of plus or minus .5 volts at a given temperature.

While the embodiments of the present invention as herein disclosed, constitute a preferred form, it is to be understood that other forms might be adopted.

What is claimed is a follows:

1. In combination, a generator having a field winding, a D.C. output cicuit energized from said generator, a first controlled rectifier having anode, cathode and gate electrodes, means connecting the anode-cathode circuit of said first controlled rectifier and the field winding of said generator across said D.C. output circuit, an oscillator circuit including a second controlled rectifier energized from said D.C. output circuit, means connecting said oscillator circuit with the cathode of said first controlled rectifier whereby pulses of voltage are applied to said cathode at a periodic rate, a voltage sensing circuit connected across said D.C. output circuit including a bridge network, said bridge network having two arms of equal resistance and two other arms comprised of at least one constant voltage device, a voltage dividing network connected between one side of said D.C. output circuit and one of the input terminals of said bridge network, means connecting the other input terminal of said bridge network to an opposite side of said D.C. output circuit, a temperature compensating resistor connected across at least a portion of said voltage dividing network, a Zener diode connected across said bridge network and across a portion of the voltage dividing network that is shunted by said temperature compensating resistor, a transistor having emitter, collector and base electrodes, means connecting the emitter and base electodes of said transistor with the output terminals of said bridge network, and means connecting the collector electrode of said transistor with the gate electrode of said first controlled rectifier.

2. In combination, a generator having a field winding, a D.C. output circuit energized by said generator, a first controlled rectifier having anode, cathode and gate electrodes, means connecting the anode-cathode circuit of said controlled rectifier in series with said field winding and across said D.C. output circuit whereby the current that flows through said field winding is a function of the conduction of said controlled rectifier in its anode-cathode circuit, a second controlled rectifier having anode, cathode and gate electrodes, an oscillator circuit energized from said D.C. output circuit and including said second controlled rectifier, said oscillator circuit including a voltage divider connected across said D.C. output circuit, a junction of which is connected with the gate electrode of said second controlled rectifier through a diode, means connecting said oscillator circuit with the cathode of said controller rectifier whereby said controlled rectifier can be turned off under certain conditions of operation, a bridge network including two arms of equal resistance and two arms formed of a plurality of series connected Zener diodes, the Zender diode arms having equal breakdown voltage characteristics, means connecting the input terminals of said bridge network across said D.C. output circuit, a silicon transistor having emitter, collector and base electrodes, means connecting the emitter and base electrodes of said transistor with the output terminals of said bridge network, and a diode coupling the collector electrode of said transistor with the gate electrode of said first controlled rectifier.

3. The combination according to claim 2 wherein a Zener diode is connected across the bridge network for protecting the bridge network.

4. In combination, a generator having a field winding, a D.C. output circuit energized from said generator, a first controlled rectifier having anode, cathode and gate electrodes, means connecting the anode-cathode circuit of said first controlled rectifier and the field winding of said generator across said D.C. output circuit, an oscillator circuit including a second controlled rectifier energized from said D.C. output circuit, means connecting said oscillator circuit with the cathode of said first controlled rectifier whereby pulses of voltage are applied to said cathode at a periodic rate, a voltage sensing circuit connected across said D.C. output circuit including a bridge network, said bridge network having two arms of substantially equal resistance and two other arms comprised of at least one constant voltage device, a voltage dividing network connected between one side of said D.C. output circuit and one of the input terminals of said bridge network, means connecting the other input terminal of said bridge network to an opposite side of said D.C. output circuit, a temperature compensating resistor connected across at least a portion of said voltage dividing network, a three terminal semiconductor control means, means connecting two terminals of said semiconductor control means with the output terminals of said bridge network, and means connecting a third terminal of said semiconductor control means with the gate electrode of said first controlled rectifier.

5. In combination, a generator having a field winding, a D.C. output circuit energized from said generator, a first controlled rectifier having anode, cathode and gate electrodes, means connecting the anode-cathode circuit of said first controlled rectifier and the field winding of said generator across the D.C. output circuit, an oscillator circuit including a second controlled rectifier energized from said D.C. output circuit, means connecting said oscillator circuit with the cathode of said first controlled rectifier whereby pulses of voltage are applied to said cathode at a periodic rate, a voltage sensing circuit connected across said D.C. output circuit including a bridge network, said bridge network having two arms of substantially equal resistance and two other arms comprised of at least one constant voltage device, a circuit connected between one side of said D.C. output circuit and one of the input terminals of said bridge network including a temperature compensating resistor, means connecting the other input terminal of said bridge network to an opposite side of said D.C. output circuit, and a semiconductor control means connected with the output terminals of said bridge network and with the gate electrode of said first controlled rectifier for controlling the conduction of said first controlled rectifier in accordance with the voltage applied to said bridge network.

6. In combination, a generator having a field winding, a D.C. output circuit energized by said generator, a first controlled rectifier having anode, cathode and gate electrodes, means connecting the anode-cathode circuit of said first controlled rectifier in series with said field winding and across said D.C. output circuit whereby the current that flows through the field winding is a function of the conduction and nonconduction of said controlled rectifier in its anode-cathode circuit, a second controlled rectifier having anode, cathode and gate electrodes, an oscillator circuit energized from said D.C. output circuit and including said second controlled rectifier, said oscillator circuit including a voltage divider connected across said D.C. output circuit, a junction of said voltage divider being connected with the gate electrode of said second controlled rectifier through a diode, means connecting said oscillator circuit with the cathode of said first controlled rectifier whereby said first controlled rectifier can be turned off under certain conditions of operation, a bridge network including two arms of substantially equal resistance and two other arms formed of a plurality of series connected Zener diodes, the Zener diode arms having equal breakdown voltage characteristics, means connecting the input terminals of said bridge network across said D.C. output circuit, a semiconductor control means having at least three terminals, means connecting two terminals of said semiconductor control means with the output terminals of said bridge network, and a diode coupling a third terminal of said semiconductor control means with the gate electrode of said first control rectifier.

7. A voltage regulator adapted to control the field current of a generator for regulating the output voltage of the generator comprising, a first terminal, a second terminal, a field terminal, said first and second terminals being adapted to be energized by said generator and said field terminal being adapted to be connected with the field winding of said generator, a first controlled rectifier having anode, cathode and gate electrodes, means connecting the anode-cathode circuit of said first controlled rectifier between said first terminal and said field terminal, an oscillator circuit including a second controlled rectifier energized from said first and second terminals, means connecting said oscillator circuit with the cathode of said first controlled rectifier whereby pulses of voltage are applied to said cathode at a periodic rate when said regulator is energized, a voltage sensing circuit connected across said first and second terminals including a bridge network, said bridge network having two arms of substantially equal resistance and two other arms comprised of at least one constant voltage device, a circuit connected between one of said first and second terminals and one of the input terminals of said bridge network including a temperature compensating resistor, means connecting the other input terminal of said bridge network to one or the other first and second terminals, and a semiconductor control means having at least three terminals, means connecting two terminals of said semiconductor control means with the output terminals of said bridge network, and means connecting a third terminal of said semiconductor control means with the gate electrode of said first controlled rectifier, said semiconductor control means being operative to control the conduction of said first controlled rectifier as a function of the signal output of said bridge network.

8. A voltage regulator for a self-excited generator comprising, a first terminal, a second terminal, a field terminal, said first and second terminals being adapted to be energized by said generator, said field terminal being adapted to be connected with the field winding of a generator, a first controlled rectifier having anode, cathode and gate electrodes, means connecting the anode-cathode circuit of said first controlled rectifier between said first terminal and said field terminal, a second controlled rectifier having anode, cathode and gate electrodes, an oscillator circuit energized from said first and second terminals and including said second controlled rectifier, said oscillator circuit including a voltage divider connected across said first and second terminals, a junction of said voltage divider being connected with the gate electrode of said second controlled rectifier through a diode, means connecting said oscillator circuit with the cathode of said first controlled rectifier whereby said first controlled rectifier can be turned off, a bridge network including two arms of substantially equal resistance and two other arms formed of a plurality of series connected Zener diodes, the Zener diode arms having equal breakdown voltage characteristics, means connecting the input terminals of said bridge network across said first and second terminals, and a semiconductor control device having at least three terminals, means connecting two terminals of said semiconductor control device with the output terminals of said bridge network, and a diode coupling a third terminal of said semiconductor control device with the gate electrode of said first controlled rectifier, said semiconductor control device controlling the conduction of said first controlled rectifier in accordance with the output signal provided by said bridge network.

References Cited by the Examiner
UNITED STATES PATENTS

| | | | |
|---|---|---|---|
| 2,892,143 | 6/53 | Sommer | 322—28 |
| 2,896,149 | 7/59 | Lowry et al. | 322—73 |
| 3,009,091 | 11/61 | Hallidy | 322—28 |
| 3,040,270 | 6/62 | Gutzwiller | 307—88.5 |

LLOYD McCOLLUM, *Primary Examiner.*